United States Patent

[11] 3,633,612

| [72] | Inventor | Robert I Gross<br>Roslyn Heights, N.Y. |
|---|---|---|
| [21] | Appl. No. | 11,162 |
| [22] | Filed | Feb. 13, 1970 |
| [45] | Patented | Jan. 11, 1972 |
| [73] | Assignee | Pall Corporation<br>Glen Cove, N.Y. |

[54] FLOW INDICATOR AND VALVE
17 Claims, 2 Drawing Figs.

[52] U.S. Cl. .................................................. 137/498,
137/460, 137/551, 116/70
[51] Int. Cl. .................................................... F16k 17/22
[50] Field of Search ........................................... 138/42;
137/504, 491, 501, 498, 459, 460, 461, 551, 554,
557, 487.5; 251/65; 116/70, 117

[56] References Cited
UNITED STATES PATENTS

| 2,105,681 | 1/1938 | Armstrong | 137/498 X |
| 2,533,491 | 12/1950 | McMahon et al. | 251/65 |
| 2,668,555 | 2/1954 | Bartolat | 137/498 |
| 2,750,956 | 6/1956 | Stevenson | 137/460 |
| 3,098,500 | 7/1963 | Gruber | 137/554 X |
| 3,140,690 | 7/1964 | Siebel | 116/70 |
| 3,282,323 | 11/1966 | Katz et al. | 137/501 X |
| 3,336,941 | 8/1967 | English | 137/501 |
| 3,364,897 | 1/1968 | Mouwen | 116/70 |
| 3,468,338 | 9/1969 | Patterson | 251/65 X |
| 3,472,275 | 10/1969 | Castro et al. | 137/498 X |

*Primary Examiner*—M. Cary Nelson
*Assistant Examiner*—Robert J. Miller
*Attorney*—Janes & Chapman

ABSTRACT: A flow and/or viscosity indicator is provided having a flow-sensing means which is arranged to actuate a signal. A calibrated flow-restricting passage imposes a fluid pressure differential related to flow and/or viscosity across the flow-sensing means, and thus ensures that whenever flow and/or viscosity through the flow-restricting passage changes sufficiently, the change in flow and/or viscosity is reflected in a predetermined change in fluid pressure differential which results in movement of the flow-sensing means, in a manner to give the signal.

A valve can also be actuated upon movement of the flow-sensing means, for closing off flow through the passage or another line.

PATENTED JAN 11 1972 3,633,612

FLOW INDICATOR AND VALVE

It is frequently desirable to detect a change in flow or viscosity in a fluid system, so that appropriate action can be taken. For example, in a system for removing and discharging air entrained in hydraulic fluid, a leak can permit hydraulic fluid to enter the discharge line, and the system can be rapidly drained of fluid, with possibly disastrous results. The leak results in a change in flow, however, and if this can be detected early enough, flow can be shut off before the system fails due to loss of hydraulic fluid.

Devices have been provided which respond to a change in fluid pressure in the line and thus indirectly to any change in flow that results in a change in pressure. If the change in flow is too small to result in a significant change in pressure, however, such devices fail to actuate.

One such device, shown in Breunich, U.S. Pat. No. 3,342,959, responds only to no or virtually no flow for either of two reasons. A piston reciprocates between two extreme positions, and is brought to one such position by a cessation of flow, and to the other such position by a high upstream pressure due to a blockage downstream. At other times, while flow continues, even though it may vary greatly, the piston "floates" between the two extremes. A helical groove on the piston and the clearance between the piston and the wall provide the "floating" arrangement, in which the fluid lubricates the piston and keeps it centered. Breunich's device is not designed to sense and respond to a leak, for instance, until flow has virtually stopped, either because nearly all the fluid has gone, or because the leak is so large fluid does not flow past the leak.

In accordance with the invention, a flow indicator is provided in which any change in flow and/or viscosity in a line is converted in a calibrated manner by a flow-restricting passage into a fluid pressure differential so related to flow and/or viscosity that the change in flow and/or viscosity can be detected and evaluated for an indication thereof, or a response thereto, according to it magnitude and, optionally, its duration. Thus, the flow indicator can be made responsive or nonresponsive to flow surges, as required, and it will also detect very small changes in flow while flow continues, and can respond thereto.

The response is made by a flow-sensing means, sensitive to a predetermined fluid pressure differential imposed thereacross by the flow-restricting passage. The flow-sensing means signals the occurrence of a change in flow and/or viscosity of the predetermined magnitude.

The flow indicator of the invention comprises, in combination, a flow-sensing means movable in response to a fluid pressure differential thereacross; and a flow-restricting passage adapted to impose across the flow-sensing means a fluid pressure differential related to flow and/or viscosity in a calibrated manner, such that whenever flow and/or viscosity through the flow-restricting passage changes sufficiently to create the predetermined fluid pressure differential, the flow-sensing means moves, and gives a signal.

The term "calibrated" is used herein to refer a flow-restricting passage which is dimensioned to impose a fluid-pressure differential having a known relationship to flow and/or viscosity across a flow-sensing means sufficient to move the flow-sensing means and give a signal when a change in flow and/or viscosity that is to be detected occurs. The flow-restricting passage thus converts, and desirably also magnifies, a change in flow and/or viscosity into a corresponding change in fluid pressure differential to which the flow sensing means responds, and thus the indicator is truly flow and/or viscosity sensitive, as compared to devices which merely sense a change in pressure in the system. The dimensions of the flow-restricting passage are selected by calculation from the normal flow and/or viscosity parameters and the abnormal flow and/or viscosity parameters to be detected, so as to create a fluid pressure differential to actuate the flow-sensing means, and the passage is in this sense calibrated against flow and/or viscosity therethrough, both normal and abnormal.

The invention also provides a flow and/or viscosity indicator and valve responsive to flow and/or viscosity changes to shut off flow which comprises, in combination, a flow-sensing means movable in response to a fluid pressure differential thereacross; and flow-restricting passage adapted to impose across the flow-sensing means a fluid pressure differential related to flow and/or viscosity in a calibrated manner; and valve means operatively associated with the flow-sensing means so as to close off flow whenever the flow-sensing means responds, such that whenever flow and/or viscosity through the flow-restricting passage changes sufficiently to create the predetermined fluid pressure differential, the flow-sensing means moves the valve to close off flow.

The flow sensing means of the invention is not pressure-sensitive in the sense that its response is dependent upon an increase or decrease in the static line pressure, Neither an increase in the pressure of the fluid in the upstream line, nor a decrease in the pressure of the fluid in the downstream line, affects its operation except to the extent that a change in fluid pressure differential thereacross arises from a change in flow and/or viscosity.

The flow-sensing means of the present invention therefore truly detects only abnormal flows, while flow continues. If a leak in the system does not create a substantial change in pressure, but does change the flow, the flow-sensing means will sense and respond to the condition because the flow has changed, and thus creates a change in fluid pressure differential across the flow-restricting passage. It thus provides the high degree of sensitivity necessary for the detection, indication and stoppage of small leaks and other flow abnormalities in many types of fluid systems.

Figure 1:
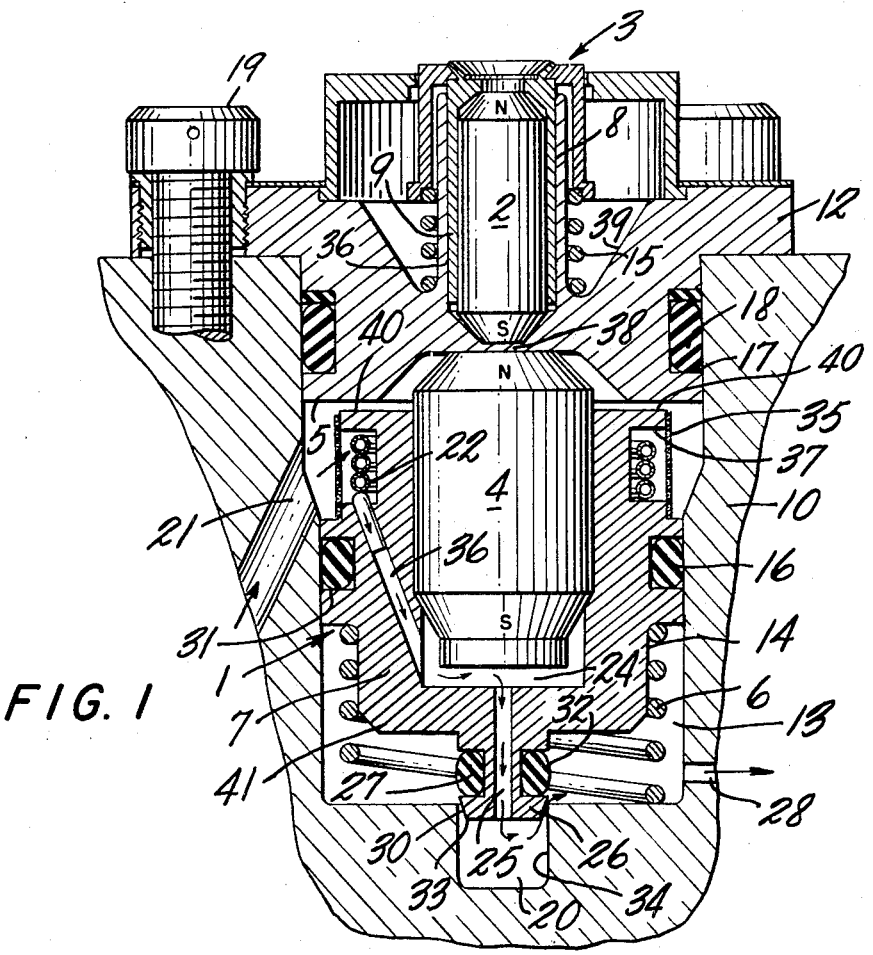
FIG. 1 is a view in cross section of an embodiment of a flow and/or viscosity indicator and valve in accordance with the invention.

The flow and/or viscosity indicator of the invention is designed to carry all or part of the flow in the fluid system; if all, it is in series, and if part, it is in parallel, with the system. The flow proceeds past the flow-sensing means via the flow-restricting passage, which links the upstream and downstream pressure surfaces of the flow-sensing means. The fluid pressure differential related to flow and/or viscosity through the passage thus acts on these surfaces.

The calibrated flow-restricting passage is sized to carry past the flow-sensing means the normal line of flow and imposes under the flow and/or viscosity conditions to be detected a fluid pressure differential, which when sensed by the upstream and downstream surfaces of the flow-sensing means urges it towards one of its two positions.

The flow-restricting passage can be formed directly in the flow-sensing means. It may also be formed in surrounding structure, separate from the flow-sensing means.

The flow-sensing means has a sufficiently large upstream and downstream surface area, and the force created by the differential pressure acting thereupon is great enough, to move it to an actuated position, whenever the change in flow and/or viscosity to be detected develops across the flow-sensing means. Suitable flow sensing means include pistons; deflectable diaphragms fixed at their periphery, or at their center, or both; compressible or expandible bellows: and Belleville spring discs, as disclosed in U.S. Pat. No. 3,164,164 to Pall et al., deflectible about either their inner or outer peripheries, or both.

In determining which type of flow-sensing means is best suited for a particular fluid system, such parameters as the amount of travel and the magnitude of the variations in normal flow and/or viscosity through the indicator are considered. If extreme sensitivity and sure response to small flow and/or viscosity changes are important, flow-sensing means having large pressure-exposed surface areas, such as diaphragms and bellows, are usually preferred. But, if high fluid pressure differentials are expected, diaphragms and bellows may not possess the requisite strength. In most cases, pistons have the necessary sensitive and strength, combined with reliability of response and long life, and therefore are preferred.

The flow-sensing means is preferably biased in one position by bias means such as a spring or magnet, or both. A Belleville spring disc has a built-in spring bias. The flow-sensing means is best biased against the direction of flow through the flow-restricting passage, and preferably against a stop, which can be a wall of the structure in which the flow-sensing means is housed. If the flow-sensing means is biased against a stop, the bias means can be made strong enough to hold the means steady during flow fluctuations of short duration and prevent a signal being given during a flow surge.

The flow-restricting passage can be long enough and narrow enough to impose a laminar flow on fluid passing therethrough, in which the relationship between the flow and/or viscosity and the fluid pressure differential developed thereacross is linear, or short enough and wide enough to impose turbulent flow on the fluid passing therethrough, in which event, the differential pressure developed thereacross is proportional to the square of the flow. In general, if the Reynolds number of fluid flowing through the passage is less than 2,000, flow will be laminar flow, and if the Reynolds number is substantially greater than 2,000, flow will be turbulent. These are, of course, known flow principles.

Flow rate and fluid viscosity are important in determining the design of flow-restricting passage to utilize. If the fluid viscosity and flow rate throughout the system at all times are relatively constant, and sensitivity over a narrow range of flow is sufficient, passages that impose either turbulent flow or laminar flow or both, depending upon the conditions, will operate quite satisfactorily to provide the necessary differential pressure across the flow-sensing means. If, however, a response over a wide range of flow is expected, passages that impose turbulent flow and laminar flow over the range are not always satisfactory, due to the fact that there is a transition zone between turbulent and laminar flow where the fluid displays characteristics of both, and in this zone, the operation of the flow-sensing means may be erratic. Moreover, the viscosity of fluids is inversely proportional to the temperature; at low temperatures, the flow rate through the flow passage may be slow enough, due to an increased fluid viscosity, that the fluid flow changes from turbulent to laminar flow.

Flow restricting passages that are long enough and narrow enough to impose laminar flow over all the ranges of flow and temperature to be encountered are, therefore, preferred.

A capillary passage will impose laminar flow under all flow conditions. The capillary passage can be formed through the flow-sensing means, or a separate capillary tube can be attached thereto or mounted thereon either alone or coupled with a passage extending though the flow-sensing means. In any case, the size of the capillary passage should not vary according to the position of the flow-sensing means. A capillary can also be disposed in the structure in parallel with the flow-sensing means. For example, it is possible for the flow-restricting passage to comprise a narrow bypass passage formed in the wall of the structure in which the flow-sensing means is positioned.

Orifices or venturis can also be formed through, or as part of, the flow-sensing means, or formed in parallel thereto, or the surrounding housing structure. These impose turbulent flow characteristics on fluid passing therethrough, according to fluid viscosity and flow rate.

The dimensions of the flow-restricting passage are determined by applying fluid dynamics equations to the flow conditions of the particular system and by modifying the dimensions as required by empirical study of the system conditions. The flow-restricting passage must create a differential pressure for a given flow to be detected therethrough that is high enough to ensure that it can be detected, but normal flow should not be appreciably impeded.

If the flow-restricting passage is narrow, it is desirable to protect the entrance with a filter screen to prevent blockages.

A preferred form of flow-sensing means is magnetic, and gives a signal when it moves from one position to another. The term "magnetic" is used herein to encompass magnetically attracted materials, susceptible of being magnetized, and permanent and temporary magnets, such as electromagnets. Thus, the flow-sensing means can be or include a magnet, or it can be of magnetically attracted material.

The signal actuated by movement of the flow-sensing means can be a pop-up indicator button, a lever arm or pointer, or an electric switch, which opens or closes a circuit to light a light, ring a bell, or shut off the flow by halting a pump. Actuation of the signal can be the result of a diminished or an increased magnetic attraction upon movement of the flow-sensing means. For instance, a magnetic signalling device can be attracted to or repelled by the magnetic flow-sensing means in one position, and held in place by bias means acting in opposition to the magnetic force of the flow-sensing means. In the attracted type, when the flow-sensing means moves away from the magnetic signalling device, and the magnetic forces are weakened, the bias means moves the latter to an actuated position. The bias means can be a spring, or a third magnet. Actuation can result from magnetic repulsion in which the magnetic signalling device is repelled upon movement of the flow-sensing means so as to move to an actuated position and give the signal.

One of the flow-sensing means and the signalling device is magnetic, and the other is a magnet, or both can be magnets. When both are magnets, the attractive or repulsive forces between them are considerably increased and the sensitivity of the device can be enhanced. When both are magnets, the poles are lined up to attract or repel each other, as required.

Combinations of magnetically coupled flow-sensing means and signalling devices are well known, and are disclosed in U.S. Pat. Nos. 2,942,572, 3,077,176, 3,077,854, 3,124,950 and 3,209,721 to Pall et al.; 3,140,690 to Siebel; 3,187,711 to Campolong; 3,335,863 to Silverwater; 3,212,471 to Willis and 3,364,897 to Mouwen.

The valve operatively associated with the flow-sensing means can be formed as a part of the flow-sensing means, so as to be movable therewith. It can also be operatively connected to the flow-sensing means by a mechanical, electromechanical, or magnetic linkage, so that it responds to the movement of the flow-sensing means. The valve can close off all or part of the flow in the line through the indicator, or in another line.

Any type of valve closure can be employed, such as a ball valve, a stopcock, a plunger valve, an umbrella valve, a flap valve or a piston valve. A piston or plug-type valve has a movement corresponding to the movement of a piston-type flow-sensing means and consequently, this type is preferred when a part of a piston.

The flow and/or viscosity indicator shown in FIG. 1 is of the in-line type. The flow indicator is within a housing 10 with a closure portion 12, the former housing the flow-sensing portion of the indicator, and the latter housing the flow-signalling portion of the indicator.

The housing 10 has a fluid inlet 21 and a fluid outlet 28 leading to and from a central bore 13. The flow-sensing means is in the form of a cylindrical piston 7 which reciprocates within the bore 13. The piston 7 has an upstream pressure surface 40, in the upper portion of bore 13, and a downstream pressure surface 41 in the lower portion of bore 13, on the downstream side of passages 22, 36, 24, 25. The piston also has a central bore 24 at one end, in which magnet 4 is inserted.

The closure 12 is formed with a cylindrical projection 5, which fits in and closes off the open end of bore 13 in housing portion 10, and screws 19 hold closure 12 to housing 10 with the projection in this position. The O-ring 18 in groove 17 of projection 5 ensures a leaktight seal against fluid leakage from the bore 13.

The piston 7 has a narrowed end 14 forming a core for spring 6, which biases the piston against the inside face of projection 5, and a groove 31 for an O-ring 16 which seals against the bore 13, while permitting reciprocation of the piston 7 within the bore so as to prevent leakage from one face to the other of the piston 7.

A flow-restricting passage is provided from the upstream face 40 to the downstream face 41 of of the piston 7. The inlet end of the passage is in a capillary tube 22 which is wound about the piston in the recess 37. The outlet end of the capillary tube 22 communicates with the inlet end of a through passage 36, which is bored through the piston at an angle so as to open into the lower end of the bore 24 in the piston, in the space beneath the magnet 4. Another through bore 25 extends from the end of bore 24 to the downstream face of the piston 7.

The capillary tube 22 provides a calibrated flow passage, and can be adjusted to any length required according to the flow conditions of the fluid system. In this case, the capillary tube 22 has a 0.012 inch inside diameter, and is 2.5 inches long.

The recess 37 is enclosed by a cylindrical filter screen 35, which sits snugly against the periphery of the piston and ensures that particles cannot block the capillary.

The passage 25 leads into and through an extended portion 26 of the piston 7, defining a valve stem. The valve stem as a part of piston 7 moves into and out of a well 20 formed in the bottom of the bore 13. The valve stem 26 has a tapered tip 33, to define an annular flow passage 30 between the tip and the wall 34 of well 20. A sealing ring 27 is provided in a recess 32 of the tip 26 to seal against the walls of the well 20 when the valve stem 26 is within the well 20, thus closing off the line 25 against the bottom of well 20.

In closure 12 is a bore 36 in which is reciprocably fitted a piston 9 carrying a magnet 2. The piston 9 also carries a cap 3 of an eye-catching color such as red. A circular recess 39 in the outer face of closure 12 surrounding bore 36 receives a compression spring 15 which engages in a recess in cap 3, and urges cap 3 and piston 9 outward.

The magnet 2 which is fitted within piston 9 has a pole of opposite polarity facing the pole of the magnet 4 carried on the magnetic piston 7, such as south to north, as shown in FIG. 1, or north to south. The force of magnetic attraction between the magnets 2 and 4 is greater than the force of the spring 15, and piston 9 is normally held at the inner end of bore 36 against wall 38 by magnetic attraction to the magnetic piston 7 on the opposite side of the wall 38.

In operation, under normal conditions, fluid passes from the inlet port 21, through the filter screen 35, and into the recess 37 and capillary tube 22, then via passage 36 into the space 24, and then via line 25 into the well 20 and through the annular space 30 into the bore 13 and out the outlet 28. In the course of passage through the capillary 22, a laminar flow creates a fluid pressure differential between faces 40, 41 of piston 7 that is related to flow between ports 21, 28 via the passages. The greater the flow, the greater the fluid pressure differential across the piston faces, as will be apparent.

Whenever flow increases or the viscosity of the fluid increases, the fluid pressure differential across the piston 7 increases.

The dimensions of the capillary and the spring 6 are selected so that at the normal flow rate and viscosity of the fluid passing from the inlet to the outlet through the capillary, the pressure differential acting on the pressure surfaces 40, 41 of the piston 7 is not sufficient to move the piston away from the wall 38. If flow rate or viscosity increases sufficiently, the pressure differential created across the piston 7 becomes sufficient to move the piston assembly against the resistance of the spring 6. When the magnet 4 is sufficiently far from the magnet 2, the force of magnetic attraction between the magnets becomes less than the bias force of the spring 15, and the piston 9 and cap 3 move away from the wall 38 into signalling position. At the same time, the valve stem 26 moves far enough into the well 20 in the bottom portion of the chamber 13 to seat the sealing ring 27 against the walls of the well 20, closing off the passage 25, which closes off flow to the outlet port 28. Therefore, the existence of the high flow volume or high viscosity is signalled by the signalling element, and the flow to the outlet is shut off simultaneously.

Figure 2:
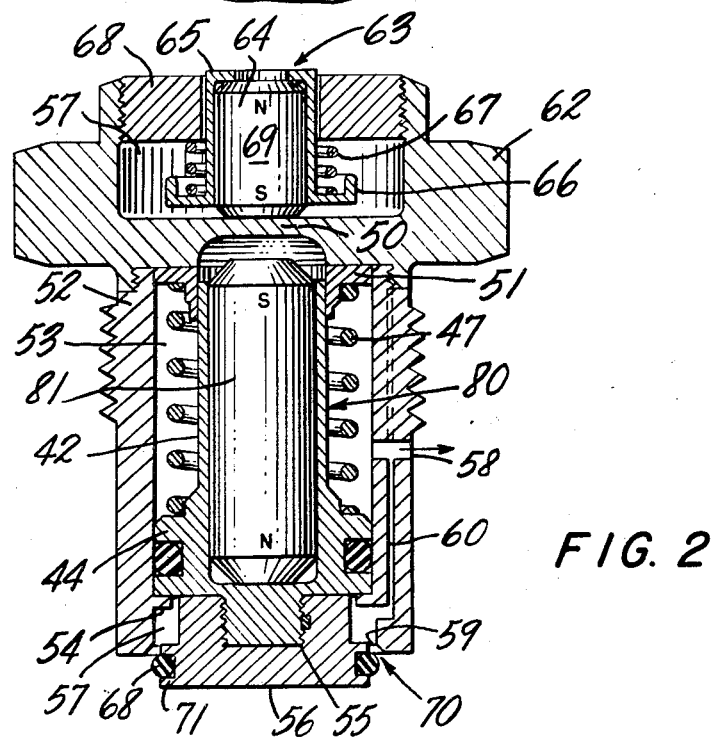
FIG. 2 is a view in cross section of another embodiment of flow and/or viscosity indicator and valve of the invention.

The embodiment of FIG. 2 is similar to that described above, with the exception that in this embodiment magnetic repulsion is employed, rather than magnetic attraction. The embodiment of FIG. 2 has flow-sensing means comprising a piston and a valve assembly 80 having a magnet 81 supported in a piston 42. The piston and valve assembly 80 is mounted in a bore 53 in the housing portion 52 and is normally biased away from a wall 50 in housing portion 62 by a spring 47 positioned between a piston guide piece 51 within bore 53 and a shoulder 44 in the piston 42. The piston and valve assembly 80 is held under the influence of spring 47 against a flange 54 formed in the base of the bore 53. The bore 53 in which the piston and valve assembly 80 is positioned is formed with an inlet port 59 and an outlet port 58. The inlet port opens into space 57 which communicates with the outlet port 58 via a flow-resisting passage in the housing 52, narrow bore 60, 1 inch long and 0.010 inch in diameter. The bore 60 is sufficiently long to impose laminar flow in the fluid passing therethrough. The bore 53 communicates with the outlet 58.

The piston 42 has a threaded member 55 extending therefrom, onto which is fastened valve member 56, which has a flange 71 which defines a narrow passage 70 through which influent fluid passes. Flange 71 has a sealing ring 68 thereon which, when the piston assembly moves away from the flange 54 in the bore 53, seats against the edge of the inlet port, sealing it off from flow.

On the opposite side of the wall 50, in housing 62, a magnetic signalling element 63 is positioned. The signalling element 63 includes a magnet 69 supported in a cap 65 formed with a flange 66 at its base. A spring 67 is captured between the flange 66 and annular retainer 68 which closes off the upper portion of the bore 57 in which the indicating element 63 is located. The spring 67 holds the indicating element against the wall 50 which separates the bore 53 from the bore 57. The magnet 69 is positioned such that the same pole faces the wall 50 as the pole of the magnet 81 which faces the wall 50. Thus, when the piston and valve assembly 80 moves toward the wall 50, the magnet 81 moves therewith and repels the magnetic element 69 into indicating position, overcoming the force of the spring 67.

In operation, under normal conditions fluid passes from the inlet port 59 through the space 57 and through the narrow bore 60 and out of the assembly through the outlet port 58. The piston and valve assembly 80, since it communicates with the inlet and outlet ports, is exposed to the pressure differential across the passage 60 but under normal flow conditions this pressure differential is insufficient to overcome the force of the spring 47, and the piston and valve assembly 80 remains against the flange 54. However, if an increase in flow volume or viscosity beyond the predetermined amount should occur, the pressure differential across the passage 60 will increase, and the piston and valve assembly senses this increase. When the pressure differential becomes sufficient to create a force on the piston greater than the force of the spring 47, the piston and valve assembly moves toward the wall 50. This forces the indicating element 63 into indicating position, signalling the occurrence of the predetermined high volume. At the same time, the valve 56 moves so that the sealing ring 68 seats against the sides of the inlet, to close it off.

Having regard to the foregoing disclosure, the following is claimed as the inventive and patentable embodiments thereof.

1. A flow and/or viscosity indicator comprising, in combination, a flow-sensing means movable in response to a fluid pressure differential thereacross; and a flow-restricting passage of fixed size and sufficiently long and narrow to impose a laminar flow on fluid passing therethrough, and to impose across the flow-sensing means a fluid pressure differential related to flow and/or viscosity in a calibrated manner, such that whenever flow and/or viscosity through the flow-restricting passage change sufficiently to create a predetermined fluid pressure differential, but not otherwise, the flow-sensing means moves, and gives a signal.

2. A flow and/or viscosity indicator in accordance with claim 1, in which the flow-restricting passage imposes a Reynolds number of less than 2,000 on fluid flow passing therethrough.

3. A flow and/or viscosity indicator in accordance with claim 1, in which the flow-sensing means is magnetic, and is magnetically coupled to the signal.

4. A flow and/or viscosity indicator in accordance with claim 1, in which the passage is a capillary passage.

5. A flow and/or viscosity indicator in accordance with claim 1, in which the flow-sensing means comprises a piston 6. A flow and/or viscosity indicator in accordance with claim 1, in which the flow-restricting passage is formed as a part of the flow-sensing means.

7. A flow and/or viscosity indicator in accordance with claim 1 including a housing having an inlet and an outlet, said flow-sensing means being mounted in the housing across the line of flow from the inlet and the outlet, and having opposite pressure surfaces respectively exposed to upstream and downstream fluid pressure.

8. A flow and/or viscosity indicator in accordance with claim 7, in which the flow-restricting passage is formed in the housing.

9. A flow and/or viscosity indicator in accordance with claim 1, in which the flow-sensing means is biased against a stop means.

10. A flow and/or viscosity indicator in accordance with claim 1, in which the flow-restricting passage in a capillary tube attached to the flow-sensing means.

11. A flow and/or viscosity indicator and valve responsive to flow and/or viscosity changes to shut off flow which comprises, in combination, a flow-sensing means movable in response to a fluid pressure differential thereacross; and a flow-restricting passage of fixed size and sufficiently long and narrow to impose across the flow-sensing means a fluid pressure differential related to flow and/or viscosity in a calibrated manner, and valve means operatively associated with the flow-sensing means so as to close off flow whenever the flow-sensing means responds, such that whenever flow and/or viscosity through the flow-restricting passage change sufficiently to create a predetermined fluid pressure differential, but not otherwise, the flow-sensing means moves the valve to close the flow.

12 A flow and/or viscosity indicator and valve in accordance with claim 11, in which the flow-sensing means is a piston.

13. A flow and/or viscosity indicator and valve in accordance with claim 11, in which the flow-sensing means is magnetic and is magnetically coupled to a signal.

14. A flow and/or viscosity indicator and valve in accordance with claim 11, in which the valve means is a piston.

15. A flow and/or viscosity indicator and valve in accordance with claim 11, in which the flow-sensing means also actuates a signalling device.

16. A flow and/or viscosity indicator and valve in accordance with claim 11, in which the flow-restricting passage is an orifice.

17. A flow and/or viscosity indicator and valve in accordance with claim 11, in which the flow-restricting passage is sufficiently long and narrow to impose a laminar flow on fluid passing therethrough.

* * * * *

PO-1050
(5/69)

UNITED STATES PATENT OFFICE
CERTIFICATE OF CORRECTION

Patent No. 3,633,612                     Dated January 1, 1972

Inventor(s) Robert I. Gross

It is certified that error appears in the above-identified patent and that said Letters Patent are hereby corrected as shown below:

| | | |
|---|---|---|
| Column 1, lines 24-25 | : | "floates" should be --floats-- |
| Column 1, line 39 | : | "it" should be --its-- |
| Column 2, line 16 | : | change the comma (,) to a period --(.)-- |
| Column 3, line 2 | : | "sensitive" should be --sensitivity-- |
| Column 3, line 53 | : | "though" should be --through-- |
| Column 6, line 17 | : | "resisting" should be --restricting-- |
| Column 7, line 11 | : | insert a period -- (.)-- after "piston" |
| Column 7, line 28 | : | "in", second occurrence, should read --is--. |

Signed and sealed this 27th day of March 1973.

(SEAL)
Attest:

EDWARD M. FLETCHER, JR.
Attesting Officer

ROBERT GOTTSCHALK
Commissioner of Patents